(12) United States Patent
Hutchings et al.

(10) Patent No.: US 9,197,915 B2
(45) Date of Patent: Nov. 24, 2015

(54) PROVIDING PERSONALIZED EXPERIENCES RELATED TO STREAMING OF BROADCAST CONTENT OVER A NETWORK

(71) Applicant: TuneIn, Inc., Palo Alto, CA (US)

(72) Inventors: Thomas Hutchings, Palo Alto, CA (US); Kristin George, Palo Alto, CA (US)

(73) Assignee: TuneIn, Inc., Palo Alto, CA (US)

( * ) Notice: Subject to any disclaimer, the term of this patent is extended or adjusted under 35 U.S.C. 154(b) by 0 days.

(21) Appl. No.: 14/215,040

(22) Filed: Mar. 16, 2014

(65) Prior Publication Data

US 2014/0282717 A1    Sep. 18, 2014

Related U.S. Application Data

(60) Provisional application No. 61/799,635, filed on Mar. 15, 2013.

(51) Int. Cl.
*H04N 21/2668* (2011.01)
*H04N 21/234* (2011.01)
*H04N 21/81* (2011.01)
*H04N 21/40* (2011.01)

(52) U.S. Cl.
CPC ..... *H04N 21/2668* (2013.01); *H04N 21/23418* (2013.01); *H04N 21/40* (2013.01); *H04N 21/81* (2013.01); *H04N 21/812* (2013.01)

(58) Field of Classification Search
CPC ....... H04N 21/32; H04N 21/40; H04N 21/81; H04N 21/135; H04N 21/136; H04N 21/234; H04N 21/112; H04N 21/149
USPC ...................... 725/32, 40, 135, 136
See application file for complete search history.

(56) References Cited

U.S. PATENT DOCUMENTS

| | | | |
|---|---|---|---|
| 2010/0115060 A1* | 5/2010 | Julia et al. ..................... | 709/219 |
| 2010/0125884 A1* | 5/2010 | Howcroft ........................ | 725/93 |
| 2014/0289000 A1 | 9/2014 | Hutchings et al. | |
| 2015/0264415 A1 | 9/2015 | Hutchings et al. | |

* cited by examiner

*Primary Examiner* — Mark D Featherstone
*Assistant Examiner* — Susan X Li
(74) *Attorney, Agent, or Firm* — Kilpatrick Townsend & Stockton LLP

(57) ABSTRACT

An approach for providing personalized experiences to users of broadcast content streaming. Supplemental content identifications are obtained for individual sets of supplemental content associated with one or more selectable events. The one or more sets of supplemental content selected based on characteristics of an event selected by the user and on one or more user characteristics. The supplemental content being presented to the user using client computing platforms along with sets of streaming broadcast content associated with one or more events selected by the user to create personalized experiences.

20 Claims, 6 Drawing Sheets

PROVIDING PERSONALIZED EXPERIENCES RELATED TO STREAMING OF BROADCAST CONTENT OVER A NETWORK

CROSS-REFERENCES TO RELATED APPLICATIONS

This application claims the benefit of U.S. Provisional Application 61/799,635, filed Mar. 15, 2013, and titled "PROVIDING PERSONALIZED EXPERIENCES RELATED TO STREAMING OF BROADCAST CONTENT OVER A NETWORK," the disclosure of which is hereby incorporated by reference in its entirety and for all purposes.

BACKGROUND

This disclosure relates to providing personalized experiences for users of a system for streaming of broadcast content over a network.

Systems that provide users with on-demand media content are known. Such systems include Netflix®, Pandora®, Time Warner Cable® On Demand, and AT&T U-verse On Demand. On-demand content may include content that is made available to the user, in its entirety, upon request. For example, a set of content available on demand can be accessed at the discretion of the user from start to finish (e.g., at the time they choose).

Systems that provide media content streamed over the Internet are known. In those systems, media content selected by users may be streamed over the :Internet to a user device such as a personal computer or a smartphone. For example, some of those systems may provide music content selectable by individual users (i.e., playlists of songs), and stream the music to one or more computing platforms, such as a smartphone, as selected by the user. Such systems may provide the user with an indication of the media content currently being streamed and an indication of media content that has previously been streamed to the user (i.e., Pandora® an automated music recommendation service). Some systems may provide a streaming radio broadcasts from one or more radio broadcast providers. Such systems may provide the user with control over the radio broadcast so that the user may, for example, pause the radio broadcast or stop the radio broadcast being provided to the user using one or more client computing platforms associated with the user.

Media content may be provided for a fee, such as a monthly subscription fee, where the user may stream content from a media provider. Alternatively, media content may be provided to users for free, whereby the media content provider may be compensated by playing or displaying advertisements and/or promotional content along with the media content.

BRIEF SUMMARY

One aspect of this disclosure relates to providing users with personalized experiences while streaming broadcast content over a network. Broadcast content being media content, such as audio, video and/or multimedia content, that is continuously streamed from one or more broadcast content providers, such as radio stations, over the Internet, to be received by users. Broadcast media, in contrast to on-demand content, may be "pushed" to users. That is, the start and stop times of broadcast media may be determined, or programmed, by a content provider hosting a content stream from which users can choose to consume content at the times programmed by the content provider. Broadcast content providers offering free broadcast content may be compensated by providing advertisements and/or promotional supplemental content along with the broadcast content. Along with broadcast content, the user may be presented with a plurality of supplemental content associated with the broadcast content and/or associated with an event having corresponding broadcast content. Providing supplemental content associated with an event and/or broadcast content to a user may enhance a user's experience of the content experience system and may provide additional revenue streams for the operator of the content experience system and/or broadcast content providers.

Events having corresponding broadcast content may be events taking place within, and/or associated with, the content experience system, and/or over a network associated with the content experience system. Events may comprise one or more sets of broadcast content to be delivered to users at client computing platforms at specified dates and times over a network. Such events may include a specified radio or television broadcast provided by a specified broadcast content provider. Users of a content experience system may select such events to be received by the users at the specified dates and times. Events may include an activity occurring external to the content experience system and/or network associated with the content experience system. Such events may include musical concerts, sporting events, important political events, community rallies, religious holidays, national holidays, anniversaries of important historical events, award ceremonies, festivals, and/or any other event that may interest one or more users. Events may have one or more sets of broadcast content corresponding to the event, such that the event may he experienced by users using the content experience system. Events may have one or more sets of broadcast content associated with the event, such that the broadcast content may be delivered to the user prior to, after, or during the event.

Supplemental content may comprise any audio, visual, and/or multimedia content associated with the event and/or sets of broadcast content associated with the event. Supplemental content may comprise information about a selected event. For example, where an event is an anniversary of a historical event, supplemental content associated with the historical event may comprise textual information describing the circumstances of the historical event. Supplemental content associated with the historical event may be one or more images depicting the historical event. A historical event being the American Revolutionary War may have associated supplemental content comprising any combination of information about the Battles of Saratoga, or the Declaration of Independence, images of paintings depicting events during the American Revolutionary War, videos of modern-day reenactments, and/or any other form of supplemental content associated with the event.

Supplemental content may comprise advertisements associated with the event. For example, where an event is a national holiday, the associated supplemental content may be an advertisement for a vacation, or for apparel worn during that particular holiday. An event corresponding to Halloween may have supplemental content being advertisements for Halloween costumes, candy, Halloween decorations, and/or other supplemental content related to Halloween.

Supplemental content may comprise merchandizing supplemental content. Merchandizing supplemental content may differ from advertising supplemental content in that merchandizing supplemental content may facilitate the purchase of items associated with the event. For example, if an event, selected by a user, is a football game, the user may be delivered merchandizing supplemental content configured to facilitate the purchase of tickets to see the football game, apparel items associated with one or more teams or players participating in the football game, and/or other merchandise associated with football.

Merchandizing supplemental content may comprise external merchandizing supplemental content provided by online locations external to the content experience system. Such online locations may comprise websites, forums, chat rooms, Hogs, wikis, virtual worlds, or any other online location associated with a selected event. The merchandizing supplemental content may be provided to the user such that when the user interacts with the supplemental content using a client computing platform associated with the user, the supplemental content, online locations, and/or other content associated with the supplemental content, may be presented to the user using the client computing platform. Merchandizing supplemental content may be a revenue generator for the content experience system provider, the broadcast content providers, and/or other parties.

Supplemental content may comprise interactive supplemental content. Interactive supplemental content may facilitate communication between one or more users of the content experience system, with users external to the content experience system, and/or with other users. For example, the supplemental content may facilitate communication in a chat room associated with a selected event, such that multiple users may interact with each other in the chat room discussing the event. The chat room may be hosted on one or more servers associated with the content experience system provider, or the supplemental content may be facilitating communication on a chat room hosted at an external online location.

The supplemental content delivered to the user may be determined based on an association with a selected event, based on one or more characteristics associated with the user, and/or based on other information. Characteristics associated with the user may include gender, location, age, user defined preferences, historical usage of the content experience system, historical purchases made through the content experience system, or other characteristics.

If the event, selected by the user, is a sporting event, the user may be presented with supplemental content associated with the sporting event and/or based on one or more characteristics of the user. For example, the user may have a user preference indicating a preference for a particular team and/or player associated with the sporting event. The user may also have one or more user parameters and/or characteristics indicating one or more locations for the user. Based on such parameters, preferences, characteristics and/or other information, the user may be presented, after selection of the sporting event, merchandizing supplemental content that facilitates purchase of merchandizing items associated with the preferred team and/or player and/or the one or more locations associated with the user, such as tickets to see a preferred team play at the one or more locations associated with the user Similarly, the user may have a purchase history through the content experience system or at an external online location, indicating that the user has a propensity to purchase particular items. The supplemental content presented to the user may be advertisements for the particular items. For example, the user may have one or more characteristics indicating that the user has an online search history where the user has viewed one or more nearby vacation locations. In response to a selection of an event corresponding to a national holiday, for example, the user may receive supplemental content associated with both the national holiday and the one or more nearby vacation locations.

One or more sets of supplemental content may be provided to a user using a client computing platform upon a selection, by the user, of an event. One or more sets of broadcast content may be provided to the user, such the user receives streamed audio, video, and/or multimedia content. The combination of the one or more sets of broadcast content and the one or more sets of supplemental content received by the user at a client computing platform generates an experience for the user associated with the event. Such experiences may make the user involvement with the content experience system more enjoyable, making the user more affable to interact with the supplemental content. Certain ones of the sets of supplemental content may have an associated revenue generation characteristic providing an revenue stream for the broadcast content providers and/or the content experience system provider. The more a user enjoys the experience, the more time a user will use and interact with the system, thus increasing the likehhood of revenue generation.

A user of a content experience system may select one or more events. The events may be associated with sets of broadcast content streamed over the Internet by different broadcast content providers. Broadcast content corresponding with an event may be delivered to users. Additionally, one or more sets of supplemental content associated with an event may be presented to users of a content experience service.

The content experience system may include one or more servers. The server(s) may be configured to communicate with one or more client computing platforms according to a client/server architecture. The users may access the system via the client computing platforms. Client computing platforms may include, but not be limited to, personal computers, laptops, and/or handheld devices such as smartphones, tablets, and PDAs.

The server(s) may be configured to execute one or more computer program modules to facilitate providing personalized recommendations for streaming of broadcast content. The computer program modules may include one or more of a selection module, a broadcast content delivery module, a supplemental content module, a presentation module, an experience recommendation module, and/or other modules. The modules may comprise further modules. For example, the supplemental content module may comprise a pre-event module, a post-event module, a merchandizing module, and/or other modules. The presentation module may comprise a cycle module. In some implementations, the client computing platforms may be configured to execute one or more computer program modules that are the same as or similar to the computer program modules of the server(s) to facilitate providing personalized experiences for users of a system for streaming of broadcast content over a network.

The selection module may be configured to receive selection and/or entry by a user of an event from amongst multiple events. Selection and/or entry may be made on a client computing platform associated with the user. The client computing platform may be in electronic communication with one or more servers, over a network, such as the Internet. Individual ones of the multiple events may be associated with sets of broadcast content streamed over the Internet by one or more content providers. As previously discussed, an event may correspond with one or more broadcast content providers providing particular broadcast content at a specified time, such that the user will select and/or enter, on a client computing platform, to receive the broadcast content corresponding with the event, at the specified time. An event may be one that the user may attend in-person such as a music concert, football game, or other event that the user may attend in-person.

The broadcast content delivery module may be configured to effectuate delivery of broadcast content to the user. The delivery may be such that, responsive to reception of entry and/or selection by the user of a first event, the broadcast content delivery module effectuates preparation of the client computing platform for delivery of a stream of broadcast content. Such stream of broadcast content may be delivered to the client computing platform over a network, such as the Internet, and may include a first set of broadcast content, the first set of broadcast content corresponding to the first event.

The broadcast content delivery module may be configured to effectuate delivery of pre-event and/or post-event broadcast content to the user. The delivery of pre-event broadcast content may be responsive to a reception or entry and/or selection by the user of a first event. The delivery of post-event broadcast content may be responsive to an indication that the event has finished.

The broadcast content delivery module may be configured to effectuate delivery of the first set of broadcast content, corresponding to the first event, to the user, in response to an indication of commencement of the first event. The first set of broadcast content corresponding to the first event may replace broadcast content being previously delivered to the user through the client computing platform. An indication of commencement of the first event may be an indication that the start time for the event has been reached, may be provided via one or more structured feeds, or metadata, provided by the broadcast content providers along with the broadcast content associated and/or corresponding to the first event, and/or may take other forms.

The supplemental content module may be configured to determine sets of supplemental content associated with selected events. The supplemental content module may determine a first set of supplemental content associated with the first set of broadcast content in response to reception of selection and/or entry of the first event by the first user. The supplemental content module may be configured to determine sets of supplemental content associated with the selected event by comparing the supplemental content with one or more characteristics of the event. Characteristics of the event may be provided in metadata accompanying streams of broadcast content associated with the event or may be provided from one or more electronic databases. Such databases may be located in electronic storage associated with the one or more servers of the content experience system, and/or may be located on external resources in electronic communication with the servers of the content experience system.

The supplemental content module may further comprise a pre-event module. The pre-event module may be configured to identify a stream of a set of pre-event supplemental audio, visual and/or multimedia content associated with the first event that occurs prior to the first event. The pre-event module may be configured to identify a stream of a set of pre-event supplemental content in response to reception of the entry and/or selection of the first event by the user. In such implementations, the presentation module may be configured to effectuate presentation of the identified stream of the set of pre-event supplemental audio, visual and/or multimedia content to the user, in response to identification of the stream of the set of pre-event supplemental audio, visual and/or multimedia content associated with the first event. The presentation of the identified stream may be through the user interface on the client computing platform prior to the first event.

The supplemental content module may further comprise a post-event module. The post-event module may be configured to identify a stream of a set of post-event supplemental audio, visual and/or multimedia content associated with the first event that occurs after the first event, in response to an indication of the first set of broadcast content corresponding to the first event concluding. In such implementations the presentation module may be configured to effectuate presentation of the identified stream of the set of post-event supplemental audio, visual and/or multimedia content to the user through the user interface on the client computing platform after to the first event. The presentation of the identified stream may be effectuated in response to identification of the stream of the set of post-event supplemental audio, visual and/or multimedia content associated with the first event.

The supplemental content module may further comprise a merchandizing module. The merchandizing module may be configured to identify a stream of a set of merchandizing supplemental content comprising supplemental video and/or audio content corresponding to one or more purchasable items related to the first event, in response to reception of the entry and/or selection of the first event. The merchandizing module may be configured to effectuate presentation of one of the identified streams of the set of merchandizing supplemental content to the user through the user interface on the client computing platform. The merchandizing module may be configured to facilitate at least one purchase of purchasable items by the user, in response to an interaction by the user with the identified stream of the set of merchandizing supplemental content. The merchandizing module may be configured to identify a stream of a set of merchandizing supplement content based on one or more characteristics of the event and one or more characteristics of the user. Such user characteristics, as discussed previously, may comprise user defined preferences, user associations, such as social media associations, interactions with one or more other users of the content experience system, purchase history of the user through interactions with the content experience system, online histories of the user, the location, age, and/or gender of the user, and/or other characteristics of the user.

Supplemental content, pre-event supplemental content, post-event supplemental content, merchandizing supplemental content, advertising supplemental content, interactive supplemental content, informational supplemental content and/or other types of supplemental content may comprise external supplemental content, the external supplemental content associated with an external Internet location. The presentation module may be configured to effectuate presentation of the identified stream of the set of external supplemental content to the user through the user interface on the client computing platform, in response to reception of the entry and/or selection of the first event. External supplemental content may comprise online locations external to the content experience system, such as websites, forums, chat rooms, blogs, social media, and other external online locations associated with the event.

The presentation module may be configured to facilitate presentation, to the user on the client computing platform, of a user interface. The user interface may reflect selection and/or entry of events by the user by presenting associated sets of supplemental content. The user interface may present to the user the first set of supplemental content in response to reception and/or selection of the first event.

The presentation module may be further configured such that the user interface includes a graphical user interface. The graphical user interface may be configured to facilitate presentation of multiple events on the client-computing platform associated with the user, and to facilitate selection and/or entry by the user of an event from amongst the multiple events. The graphical user interface may be configured to facilitate presentation of one or more sets of supplemental content to the user upon receipt of an entry and/or selection of a first event by the user. The graphical user interface may be configured to facilitate an interaction between the user and supplemental content from the set of supplemental content presented through the graphical user interface.

The presentation module may further comprise a content cycle module. The content cycle module may be configured to facilitate presentation of the first set of supplemental content associated with the first event for a defined first period of time, and a second set of supplemental content associated with the first set of broadcast content for a defined second period of time, the second set of supplemental content replacing the first set of supplemental content.

The experience recommendation module may be configured to determine a recommended event from amongst the multiple events for the user. The recommendation may be based on broadcast content streams the user has previously selected, broadcast content streams the user is currently receiving over the network, stored broadcast content stream preference information for the user, inclination of the user, habits of the user and/or other proclivities of the user in consuming broadcast content, and other selectable broadcast content streams that are currently being streamed. Additionally, as discussed previously, the experience module may be configured to determine a recommended event from amongst multiple events for the user based on one or more additional user characteristics. Such user characteristics, discussed previously, may comprise user defined preferences, user associations, such as social media associations, interactions with one or more other users of the content experience system, purchase history of the user through interactions with the content experience system, online histories of the user, the location, age, and/or gender of the user, and/or other characteristics of the user. The presentation module may be configured to facilitate presentation of the recommended event to the first user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
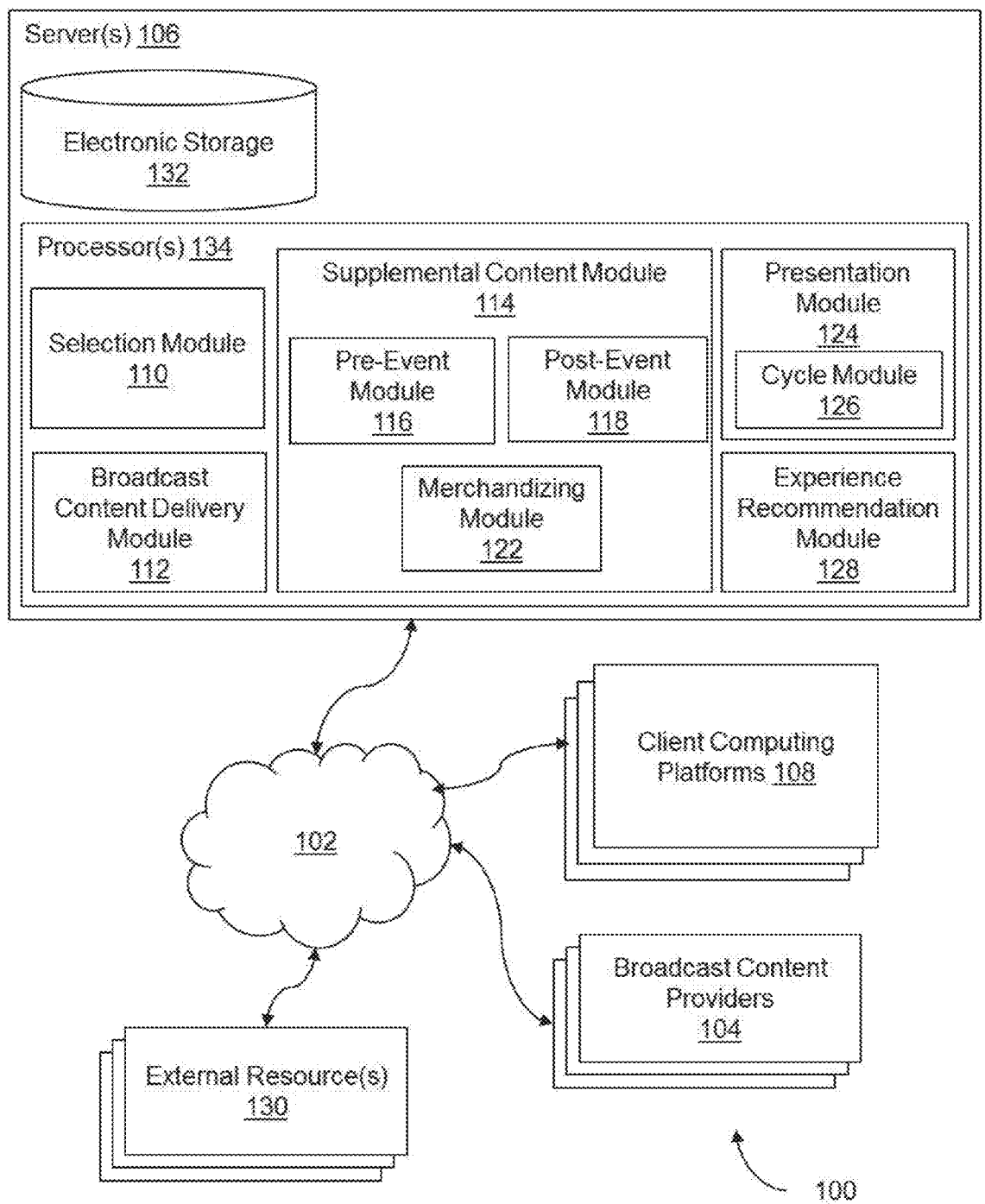
FIG. 1 illustrates a system configured to providing personalized recommendations for streaming of broadcast content over a network, in accordance with one or more implementations.

FIG. 1 illustrates a system 100 configured to provide personalized experiences for users of a system 100 for streaming of broadcast content over a network 102. In some implementations, broadcast content may be audio, video, and/or multimedia content made available, by broadcast content providers 104, over a network 102, such as the Internet, and be remotely accessible by users. In various implementations users may access broadcast content tier free. In other implementations the broadcast content may be provided to users for a fee, such as a subscription to the broadcast content provided by the broadcast content providers 104.

One or more sets of supplemental content may be provided to a user using a client computing platform 108 upon a selection, by the user, of an event. One or more sets of broadcast content may be provided to the user, such the user receives streamed audio, video, and/or multimedia content. The combination of the one or more sets of broadcast content and the one or more sets of supplemental content received by the user at a client computing platform 108 generates an experience for the user associated with the event. Such experiences may make the user involvement with the content experience system 100 more enjoyable, making the user more affable to interact with the supplemental content. Certain ones of the sets of supplemental content may have an associated revenue generation characteristic providing a revenue stream for the broadcast content providers and/or the content experience system provider. The more a user enjoys the experience, the more time a user will use and interact with the system 100, thus increasing the likelihood of revenue generation.

The system 100 may include one or more servers 106. The server(s) may be configured to communicate with one or more client computing platforms 108 according to a client/server architecture. The users may access the system 100 via the client computing platforms 108. Client computing platforms may include, but not be limited to, personal computers, laptops, and/or handheld devices such as smartphones, tablets, and PDAs.

The server(s) 106 may be configured to execute one or more computer program modules to facilitate providing personalized recommendations of broadcast content for streaming over a network 102. The computer program modules may include one or more of a selection module 110, a broadcast content delivery module 112, a supplemental content module 114, a presentation module 124, an experience recommendation module 128, and/or other modules. The modules may, themselves, comprise further modules. For example, the supplemental content module 114 may comprise a pre-event module 116, a post-event module 118, a merchandizing module 122, and/or other modules. The presentation module 124 may comprise a cycle module 126. In some implementations, the client computing platforms 108 may be configured to execute one or more computer program modules that are the same as or similar to the computer program modules of the server(s) 106 to facilitate providing personalized recommendations of broadcast content for streaming.

Broadcast content providers 104, server(s) 106, client computing platforms 108, and/or external resources 130 may be operatively linked via one or more electronic communication links. For example, such electronic communication links may be established, at least in part, via a network 102 such as the Internet and/or other networks. It will be appreciated that this is not intended to be limiting, and that the scope of this disclosure includes implementations in which broadcast content providers 104, server(s) 106, client computing platforms 108, and/or external resources 130 may be operatively linked via some other communication media. It will also be appreciated that broadcast content providers 104, server(s) 106, client computing platforms 108 and/or external resources 130 may be linked via a single network 102 or multiple networks, and the illustration in FIG. 1 is not intended to be limiting.

A given client computing platform 108 may include one or more processors configured to execute computer program modules. The computer program modules may be configured to enable an expert or user associated with the given client computing platform 108 to interface with system 100, broadcast content providers 104, server(s) 106 and/or external resources 130, and/or provide other functionality attributed herein to client computing platforms 108. By way of non-limiting example, the given client computing platform 108 may include one or more of a desktop computer, a laptop computer, a handheld computer, a tablet computing platform, a NetBook, a Smartphone, a gaming console, and/or other computing platforms.

The external resources 130 may include sources of information, hosts and/or providers of content outside of system 100, external entities participating with system 100, and/or other resources. In some implementations, some or all of the functionality attributed herein to external resources 130 may be provided by resources included in system 100.

Server(s) 106 may include electronic storage 132, one or more processors 134, and/or other components. Server(s) 106 may include communication lines, or ports to enable the exchange of information with a network 102 and/or other computing platforms. Illustration of server(s) 106 in FIG. 1 is not intended to be limiting. Server(s) 106 may include a plurality of hardware, software, and/or firmware components operating together to provide the functionality attributed herein to server(s) 106. For example, server(s) 106 may be implemented by a cloud of computing platforms operating together as server(s) 106.

Electronic storage 132 may comprise electronic storage media that electronically stores information. The electronic storage media of electronic storage 132 may include one or both of system storage that is provided integrally (i.e., substantially non-removable) with server(s) 106 and/or removable storage that is removably connectable to server(s) 106 via, for example, a port (e.g., a USB port, a firewire port, etc.) or a drive (e.g., a disk drive, etc.). Electronic storage 132 may be implemented by a cloud of computing platforms, each having electronic storage, operating together electronic storage 132. Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 132 may include one or more virtual storage resources (e.g., cloud storage, a virtual private network, and/or other virtual storage resources). Electronic storage 132 may store software algorithms, information determined by processor(s) 134, information received from server(s) 106, information received from client computing platforms 108, and/or other information that enables server(s) 106 to function as described herein.

Processor(s) 134 may be configured to provide information processing capabilities in server(s) 106. As such, processor(s) 134 may include one or more of a digital processor, an analog processor, a digital circuit designed to process information, an analog circuit designed to process information, a state machine, and/or other mechanisms for electronically processing information. Although processor(s) 134 is shown in FIG. 1 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. The processor(s) 134 may be configured to execute modules 110, 112, 114, 116, 118, 122, 124, 126, 128 and/or other modules by software; hardware; firmware; some combination of software, hardware, and/or firmware; and/or other mechanisms for configuring processing capabilities on processor(s) 134. As noted, in certain implementations, a given client computing platform 108 may include one or more processors that are the same or similar to processor(s) 134 of server(s) 106 to execute such computer program modules of client computing platform(s) 106.

It should be appreciated that although modules 110, 112, 114, 116, 118, 122, 124, 126, and/or 128, are illustrated in FIG. 1 as being co-located within a single processing unit, in implementations in which processor(s) 124 includes multiple processing units, one or more of modules 110, 112, 114, 116, 118, 122, 124, 126, 128, and/or other modules may be located remotely from the other modules. For example, one or more modules may be located and/or executed on one or more of broadcast content providers 104, client computing platforms 108, and/or external resources 130. The description of the functionality provided by the different modules 110, 112, 114, 116, 118, 122, 124, 126, 128, and/or other modules described below is for illustrative purposes, and is not intended to be limiting, as any of modules 110, 112, 114, 116, 118, 122, 124, 126, 128, and/or other modules may provide more or less functionality than is described. For example, one or more of modules 110, 112, 114, 116, 118, 122, 124, 126, 128, and/or other modules may be eliminated, and some or all of its functionality may be provided by other ones of modules 110, 112, 114, 116, 118, 122, 124, 126, 128, and/or other modules. As another example, processor(s) 134 may be configured to execute one or more additional modules that may perform some or all of the functionality attributed below to one of modules 110, 112, 114, 116, 118, 122, 124, 126, 128, and/or other modules.

The selection module 110 may be configured to receive selection and/or entry by a user of an event from amongst multiple events. Selection and/or entry may be made on a client computing platform 108 associated with the user. The client computing platform 108 may be in electronic communication with one or more servers 106, over a network 102, such as the Internet. The individual ones of events may be associated with sets of broadcast content streamed over the Internet by one or more content providers 104. An event may correspond with one or more broadcast content providers 104 providing particular broadcast content at a specified time, such that the user will select and/or enter, on a client computing platform 108, to receive the broadcast content, corresponding with the event, at the specified time. In various implementations, an event may be an event that the user may attend in-person such as a music concert, sporting game, or other event that the user may attend in-person.

The broadcast content delivery module 112 may be configured to effectuate delivery of broadcast content to the user. The delivery may be such that, responsive to reception of entry and/or selection by the user of a first event, the broadcast content delivery module 112 effectuates preparation of the client computing platform 108 for delivery of a stream of broadcast content. Such stream of broadcast content may be delivered to the client computing platform 108 over a network 102, such as the Internet, and may include a first set of broadcast content, the first set of broadcast content corresponding to the first event.

The broadcast content delivery module 112 may be configured to effectuate delivery of the first set of broadcast content, corresponding to the first event, to the client computing platform(s) 108 associated with the user in response to an indication of commencement of the first event. An indication of commencement of the first event may be an indication that the start time for the first event has been met. An indication of commencement of the first event may be information or data from the broadcast content provider 104, providing the broadcast content stream associated with the first event, to indicate the start of the event, such as metadata, provided along with the one or more sets broadcast content associated with the event. The first set of broadcast content corresponding to the first event may replace broadcast content being previously delivered to the user through the client computing platform 108 associated with the user upon receipt of a entry and/or selection of the first event by the user.

The supplemental content module 114 may be configured to determine sets of supplemental content associated with the one or more selected events. The supplemental content module 114 may determine first set of supplemental content associated with the first set of broadcast content in response to reception of selection and/or entry of the first event by the first user. The supplemental content module 114 may be configured to determine sets of supplemental content associated with the selected event by comparing the supplemental content with one or more characteristics of the event. Characteristics of the event may be provided in metadata accompanying streams of broadcast content associated with the event or may be provided from one or more electronic databases stored in electronic storage 132. Such databases may be located in electronic storage 132 associated with the one or more servers 106 of the content experience system 100, or may be located on external resources 130 in electronic communication with the servers 106 of the content experience system 100. Such electronic communication may be effectuated over a network 102, such as the Internet.

The presentation module 124 may be configured to facilitate presentation, to the user on the client computing platform 108, of a user interface. The user interface may reflect selection and/or entry of events by the user by presenting associated sets of supplemental content. The user interface may present to the user the first set of supplemental content in response to reception and/or selection of the first event.

The presentation module 124 may be further configured such that the user interface includes a graphical user interface. The graphical user interface may be configured to facilitate presentation of multiple events on the client-computing platform associated with the user, and to facilitate selection and/or entry by the user of an event from amongst the multiple events. The graphical user interface may be configured to facilitate an interaction between the user and supplemental content from the set of supplemental content presented through the graphical user interface.

Figure 2:
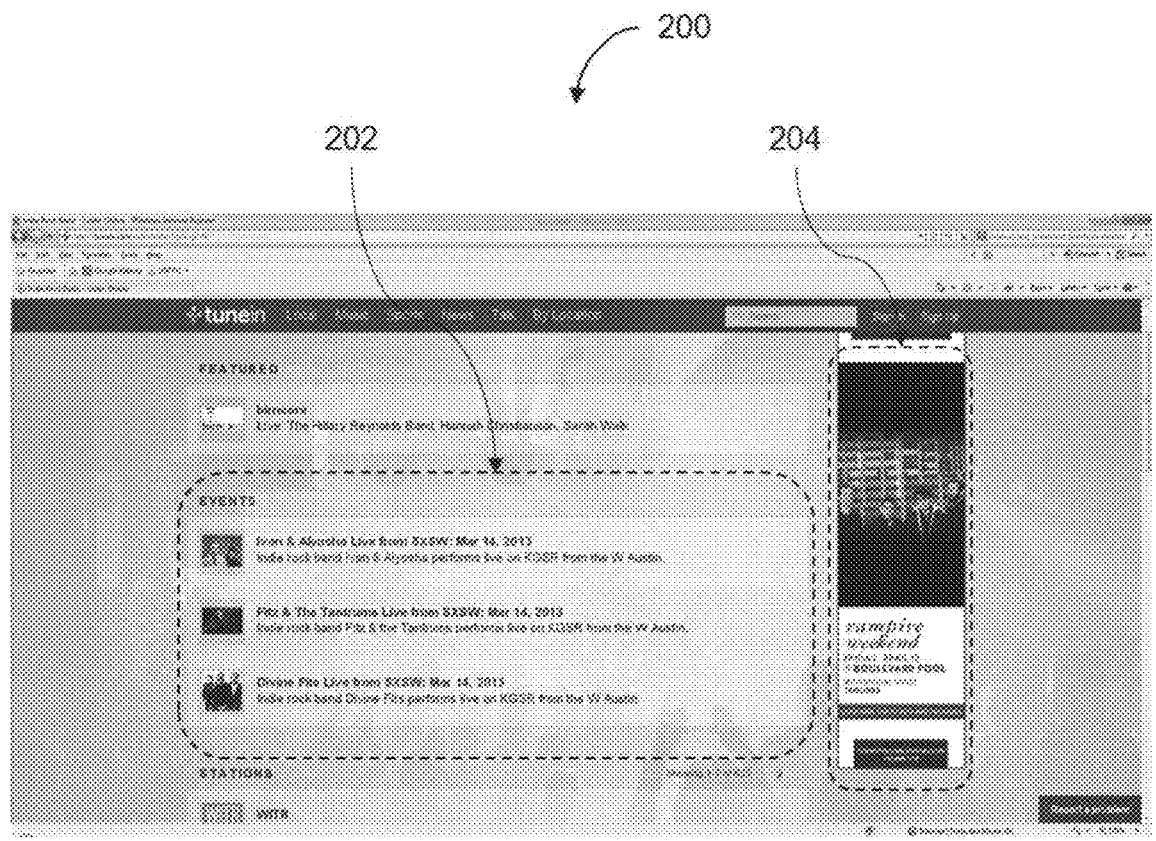
FIG. 2 illustrates a graphical user interface configured to facilitate presentation of multiple events on a client-computing platform associated with a user, according to one or more implementations.

FIG. 2 illustrates a graphical user interface 200 configured to facilitate presentation of multiple events on a client-computing platform associated with a user, according to one or more implementations. The graphical user interface 200 may comprise one or more portions configured to display one or more of broadcast content controls, selectable events, supplemental content, and/or other content. It is understood that the graphical user interface 200 may comprise any number of portions, both fewer and more numerous than those illustrated in FIG. 2. The illustration FIG. 2 is not intended to limit the design and structure of the graphical user interface 200. An event portion 202 may be configured to facilitate presentation of one or more events to the user on the client computing platform 108 associated with the user. The event portion 202 of the graphical user interface 200 may be configured to facilitate selection and/or entry of an event from the multiple events displayed in the event portion 202. The user may select and/or enter an event by interacting with the event portion 202 displayed using the client computing platform 108 associated with the user. The events displayed in event portion 202 may have one or more common characteristics, for example, the events displayed in event portion 202 may have a common genre, such as indie rock, or pop. Such events may be presented in response to the experience recommendation module 128 determining a recommendation for one or, more events for the user.

The graphical user interface 200 may also comprise one or more supplemental content portions 204. In some implementations, the supplemental content portions 204 may display one or more advertisements. The advertisements displayed in supplemental content portion 204 may be associated with one or more of the events displayed in event portion 202. The advertisements may relate to one or more characteristics of any of the one or more event displayed in the event portion 202. The advertisements may relate to a common characteristic of the events displayed in event portion 202. In various implementations, the advertisements may relate to one or more user characteristics. The one or more user characteristics may comprise preference information for the user, inclination of the user, habits of the user, other proclivities of the user, and/or other characteristics of the user herein discussed.

Figure 3:
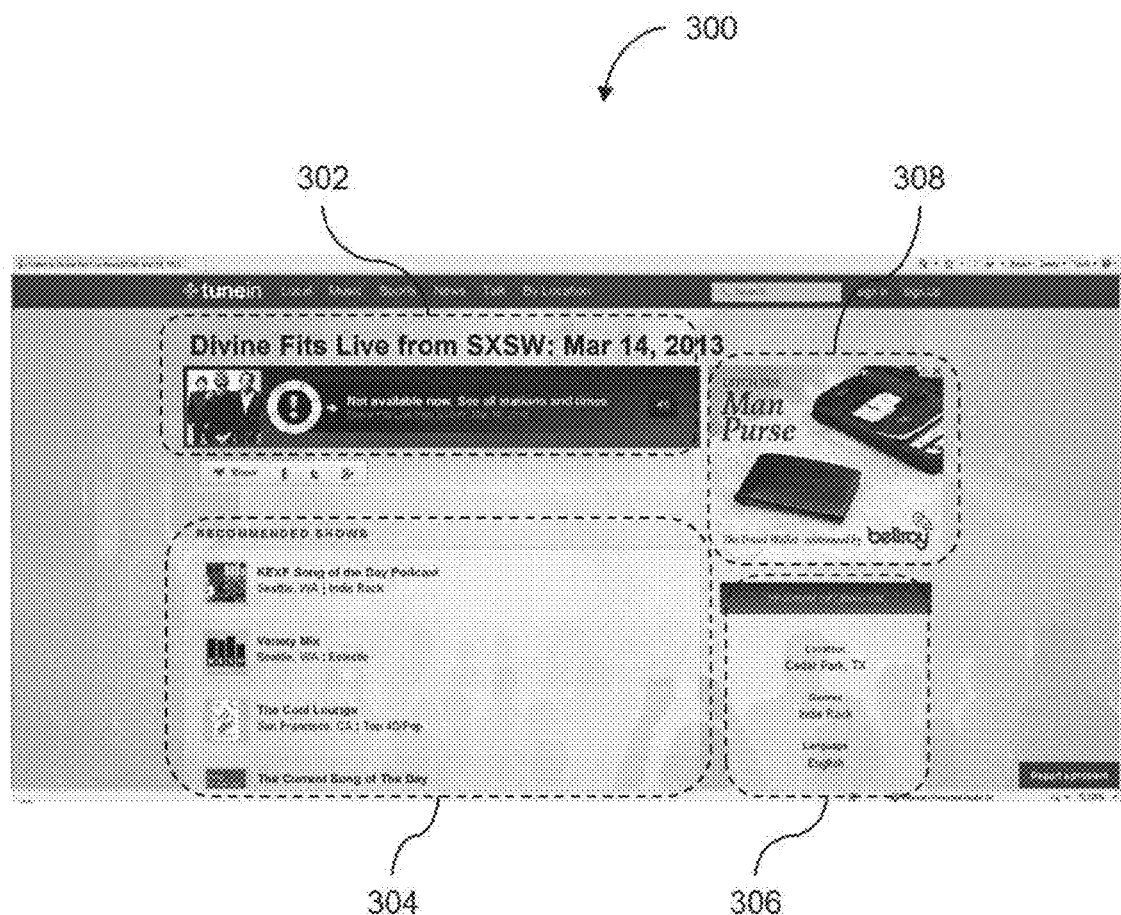
FIG. 3 illustrates a view of a graphical user interface to facilitate control of streaming broadcast content, in accordance with one or more implementations.

With reference to FIG. 3, illustrated is a view of a graphical user interface 300 to facilitate control of streaming broadcast content, in accordance with one or more implementations. The graphical user interface 300 may be implemented on one or more of the client computing platforms 108. The graphical user interface 300 may comprise one or more portions. For example, the graphical user interface 300 may comprise portions 302, 304, 306, 308 and/or other portions. It is understood that the graphical user interface 300 may comprise any number of portions, both fewer and more numerous than those illustrated in FIG. 3. The illustration in FIG. 3 is not intended to limit the design and structure of the graphical user interface 300. It is also understood that the portions 302, 304, 306, 308 and/or other portions, may be positioned at any location within the graphical user interface 300, and may take the form of any shape. The portions 302, 304, 306, 308 and/or other portions of the graphical user interface 300 may be configured to perform one or more functions.

For example, portion 302 may be configured to facilitate user control of the broadcast content streaming to the first user. Control portion 302 may facilitate pausing or stopping of the broadcast content stream being received by the first user. Where applicable, the control portion 302 may facilitate rewinding or fast forwarding of the broadcast content stream being received by the first user. In various implementations, the control portion 302 may facilitate moving from a first broadcast content stream to a second broadcast content stream in a playlist comprising multiple broadcast content streams. Such manipulation of the broadcast content stream may be implemented in response to an interaction by the user with one or more areas of the control portion 302.

The graphical user interface 300 may comprise one or more portions configured to provide to the user supplemental content to create an experience for the user in response to the user selecting one or more events. Supplemental content may comprise one or more of advertisements, information, icons, audio and/or video content, advertisements, purchasable items, external online locations, interactive supplemental content and/or other supplemental content to be displayed to the first user. For example, portion 308 of the graphical user interface may be configured to display to a first user one or more advertisements. The one or more advertisements may be selected from a group of advertisements corresponding to one or more user demographics determined from information stored in the user account. Such user demographics may be user preferences selected by the user, prior purchase history of the user, online interactions of the user, location of the user, the weather at the user's location, or any other information related to the user as herein discussed. In various implementations, the one or more advertisements may correspond to the broadcast content set being streamed and delivered to user and/or the event selected by user along with the user characteristics and preferences.

The graphical user interface 300 may comprise one or more portions configured to display information related to the broadcast content stream being delivered to the user. For example, portion 306 may be configured to display an icon, or image corresponding to the broadcast content stream currently being delivered to the user. Portion 306 may display, to the user, an identification icon, such as a logo, identifying the broadcast content provider 104 providing the broadcast content stream being delivered to the user.

The supplemental content module 114 may further comprise a pre-event module 116. The pre-event module 116 may be configured to identify a stream of a set of pre-event supplemental audio, visual, and/or multimedia content associated with the first event that occurs prior to the first event. The pre-event module 116 may be configured to identify a stream of a set of pre-event supplemental content in response to reception of the entry and/or selection of the first event by the user. In such implementations, the presentation module 124 may be configured to effectuate presentation of the identified stream of the set of pre-event supplemental audio, visual and/or multimedia content to the user, in response to identification of the stream of the set of pre-event supplemental audio, visual and/or multimedia content associated with the first event. The presentation of the identified stream may be effectuated through the user interface 300 on the client computing platform 108 prior to the first event.

With reference to FIG. 2, multiple events may be displayed in the event portion 202 of the user interface 200. The user may use the client computing platform 108 associated with the user to facilitate selection of an event from the list of multiple events in the event portion 202 of the user interface 200. The event may be a scheduled to take place at a future time. The selection module 110 may receive selection and/or entry by a user of the event. The event may be associated with one or more sets of broadcast content streamed over the Internet. Upon a selection of an event by the user, the system may be configured to facilitate presentation of a user interface 300 on the client computing platform 108 associated with the user. The user interface 300 may be a second user interface, or it may be the same as user interface 200 whereby the user interface 200 has been modified to resemble user interface 300. Such replacement and/or modification may be effectuated with the presentation module 124, using the client computing platform 108 associated with the user.

User interface 300 may be configured to facilitate control and/or manipulation, by the user, of one or more sets of streaming broadcast content. As discussed previously, portion 302 may be configured to facilitate control of the broadcast content streaming to the client computing platform 108 associated with the user. The broadcast content streaming to the user prior to an event may be a stream of a set of pre-event broadcast content, identified by the pre-event module 116, in response to an entry and/or selection of a future event from the event portion 202 of the user interface 200. User interface 300 may be configured to facilitate presentation of pre-event supplemental audio, video and/or multimedia content associated with the selected future event. Such pre-event supplemental content may be presented to the user, using the client computing platform 108 associated with the user, through one or more supplemental content portions of the graphical user interface 300. For example, supplemental content portions 306 and 308 of the user interface 300 may be configured to present to the user one or more sets of pre-event supplemental content associated with the selected event.

The broadcast content delivery module 112 may be configured to effectuate delivery of pre-event and/or post-event broadcast content to the user. The delivery of pre-event broadcast content may be responsive to a reception or entry and/or selection by the user of a first event. The delivery of post-event broadcast content may be responsive to an indication that the event has finished.

Pre-event broadcast content may comprise any audio, video, and/or multimedia broadcast content associated with the event. In the instance where the selected event is a sporting event, the pre-event broadcast content may comprise one or more of pre-game commentary, discussions regarding one or more of the teams and/or players that will participate in the football game, discussions regarding predictions of the outcome of the sporting event, one or more videos of prior similar sporting events, one or more replays of audio commentary of prior similar sporting events, or any other broadcast content associated with the sporting event.

Pre-event supplemental content may be any content associated with the selected future event. Pre-event supplemental content may be information and/or images associated with the event and/or pre-event broadcast content. In the instance where the selected event is a sporting event, the pre-event supplemental content may be one or more of information about one or more of the teams, players, and/or other entities and/or people associated with the sporting event, an image associated with one or more of the teams and/or players, such as a team emblem or mascot, or a headshot of one or more players, statistics related to one or more of the teams and/or players, video footage of previous similar sporting events and/or portions of sporting events that the teams and/or players have previously participated in, or any other supplemental content associated with the event.

The supplemental content module 114 may further comprise a post-event module 118. The post-event module 118 may be configured to identify a stream of a set of post-event supplemental audio, visual and/or multimedia content associated with the first event that occurs after the first event, in response to an indication of the first set of broadcast content corresponding to the first event concluding. In such implementations the presentation module 124 may be configured to effectuate presentation of the identified stream of the set of post-event supplemental audio, visual and/or multimedia content to the user through the user interface on the client computing platform after to the first event. The presentation of the identified stream may be effectuated in response to identification of the stream of the set of post-event supplemental audio, visual and/or multimedia content associated with the first event.

The broadcast content streaming to the user after an event may be a stream of a set of post-event broadcast content, identified by the post-event module 116, in response to an entry and/or selection of an event from the event portion 202 of the user interface 200, and in response to an indication that the first set of broadcast content corresponding with the event has ended. User interface 300 may be configured to facilitate presentation of post-event supplemental audio, video and/or multimedia content associated with the prior event, in response to an indication that the event has ended. Such post-event supplemental content may be presented to the user, using the client computing platform 108 associated with the user, through one or more supplemental content portions of the graphical user interface 300. For example, supplemental content portions 306 and 308 of the user interface 300 may be configured to present to the user one or more sets of post-event supplemental content associated with the event.

Post-event broadcast content may comprise any audio, video, and/or multimedia broadcast content associated with the event. In the instance where the selected event is a sporting event, the post-event broadcast content may comprise one or more of commentary on the sporting event, discussions regarding one or more of the teams, players, and/or other entities or people associated with the sporting event, discussions regarding predictions of future performance of one or more of the teams and/or players, one or more video replays of the football game, one or more replays of audio commentary broadcast during the sporting event, or any other broadcast content associated with the sporting event.

Post-event supplemental content may be any content associated with the event. Post-event supplemental content may be information and/or images associated with the event and/or post-event broadcast content. In the instance where the selected event is a sporting event, the post-event supplemental content may be one or more of information about one or more of the teams, players, and/or other entities or people associated with the sporting event, an image associated with one or more of the teams and/or players, such as a team emblem or mascot, or a headshot of one or more players, statistics related to one or more of the teams and/or players, video footage of the sporting event, post-game commentary provided by one or more supplemental content sources, or any other supplemental content associated with the event.

The supplemental content module 114 may further comprise a merchandizing module 122. The merchandizing module 122 may be configured to identify a stream of a set of merchandizing supplemental content comprising supplemental video and/or audio content corresponding to one or more purchasable items related to the first event, in response to reception of the entry and/or selection of the first event. The merchandizing module 122 may be configured to effectuate presentation of one of the identified streams of the set of merchandizing supplemental content to the user through the user interface on the client computing platform 108. The merchandizing module 122 may be configured to facilitate at least one purchase of the purchasable item by the user, in response to an interaction by the user with the identified stream of the set of merchandizing supplemental content.

The merchandizing module 114 may be configured to effectuate presentation of merchandizing supplemental content to the user using one or more portions of the graphical user interface 300 displayed to the user using one or more client computing platforms 108 associated with the user. Merchandizing supplemental content may comprise supplemental content configured to facilitate a purchase, by the user, of items associated with the selected event, and/or one or more characteristics of the user. In the instance when the selected event is a sporting event, the merchandizing supplemental content may be supplemental content configured to facilitate the purchase of tickets to the sporting event or one or more sporting events, paraphernalia associated with one or more teams, players, and/or other entities or persons associated with the sporting event.

The merchandizing module 114 may be configured to effectuate presentation of merchandizing supplemental content to the user, the merchandizing supplemental content associated with the event and/or one or more characteristics of the user. One or more characteristics of the user may indicate that the user is a fan of a particular sporting event, team, player, athlete, and/or other persons or entities, and other characteristics of the user may indicate that the user has a first associated location. The merchandizing module 114 may be configured to effectuate presentation of merchandizing supplemental content associated with the sporting event, team, player, athlete, and/or other persons or entities and also associated with the first associated location for the user.

Supplemental content, pre-event supplemental content, post-event supplemental content, merchandizing supplemental content, advertising supplemental content, interactive supplemental content, informational supplemental content and/or other types of supplemental content may comprise external supplemental content, the external supplemental content associated with an external Internet location. The presentation module may be configured to effectuate presentation of the identified stream of the set of external supplemental content to the user through the user interface on the client computing platform, in response to reception of the entry and/or selection of the first event. External supplemental content may comprise online locations external to the content experience system, such as websites, forums, chat rooms, blogs, social media, and other external online locations associated with the event.

The presentation module 124 may be configured to effectuate presentation of external supplemental content through the user interface 300 at a time before the selected event, during the selected event, or at a time after the selected event. External supplemental content may comprise one or more websites, and/or content from one or more external locations. For example, the presentation module 124 may be configured to facilitate presentation, in a supplemental content portion 308 of the graphical user interface 300, of external supplemental content related to one or more websites associated with the event. In the instance where the event is a sporting event, the external supplemental content displayed in supplemental content portion 308 may be a stream of interactions between users on an external website dedicated to one or more of the teams, players and/or other parties or entities participating and/or associated with the sporting event. For such supplemental content, the supplemental content portion 308 of the user interface 300 may be configured to facilitate communication between a user of the content experience system 100 and the users of the chat module on the external website. The external supplemental content may be an image or information associated with an external website, which, itself, is associated with the selected event.

The presentation module 124 may further comprise a content cycle module 126. The content cycle module 126 may be configured to facilitate presentation of the first set of supplemental content associated with the first event for a defined first period of time, and a second set of supplemental content associated with the first set of broadcast content for a defined second period of time, the second set of supplemental content replacing the first set of supplemental content.

The experience recommendation module 128 may be configured to determine a recommended event from amongst the multiple events for the user. The recommendation may be based on broadcast content streams the user has previously selected, broadcast content streams the user is currently receiving over the network, stored broadcast content stream preference information for the user, inclination of the user, habits of the user, other proclivities of the user in consuming broadcast content, and/or other characteristics of the user herein discussed, and other selectable broadcast content streams that are currently being streamed. The presentation module 124 may be configured to facilitate presentation of the recommended event to the first user.

The experience recommendation module may be configured to access one or more user profiles on external online locations. For example, the user may have linked a user account on the broadcast content system with a user account on one or more electronic social media locations. The experience recommendation module may look at interactions of the user electronic social media to provide recommendations to a first user of future events. Such interactions may comprise events that other users, associated with a first user, have selected, or may include comparing content of the first user, such as posts, on electronic social media with one or more event characteristics.

Electronic social media may include the micro-blogging service provided by Twitter™, the social network provided by Facebook™, the social network provided by MySpace™, the social network provided by Foursquare®, the virtual world provided by SecondLife®, the massively multi-player online game provided by World of Warcraft®, the file sharing service provided by Flickr®, Blogger, YouTube, PlayStation® Home, Xbox® Live, and/or other interactive electronic social media. Such electronic social media applications may be accessed by the users through one or more client computing platforms 108, the client computing platforms 108 in electronic communication with one or more external resources 130 corresponding to electronic social media applications.

In various implementations, electronic social media applications may be accessed by users through server(s) 106, such that server(s) 106 facilitate interaction between client computing platform(s) 108 and external resources 130 corresponding to electronic social media applications. The broadcast content recommendation module 116 may be configured to determine recommended broadcast content for users, based on an indication of the frequency that an individual one of a set of broadcast content is being discussed on electronic social media applications.

Figure 4:
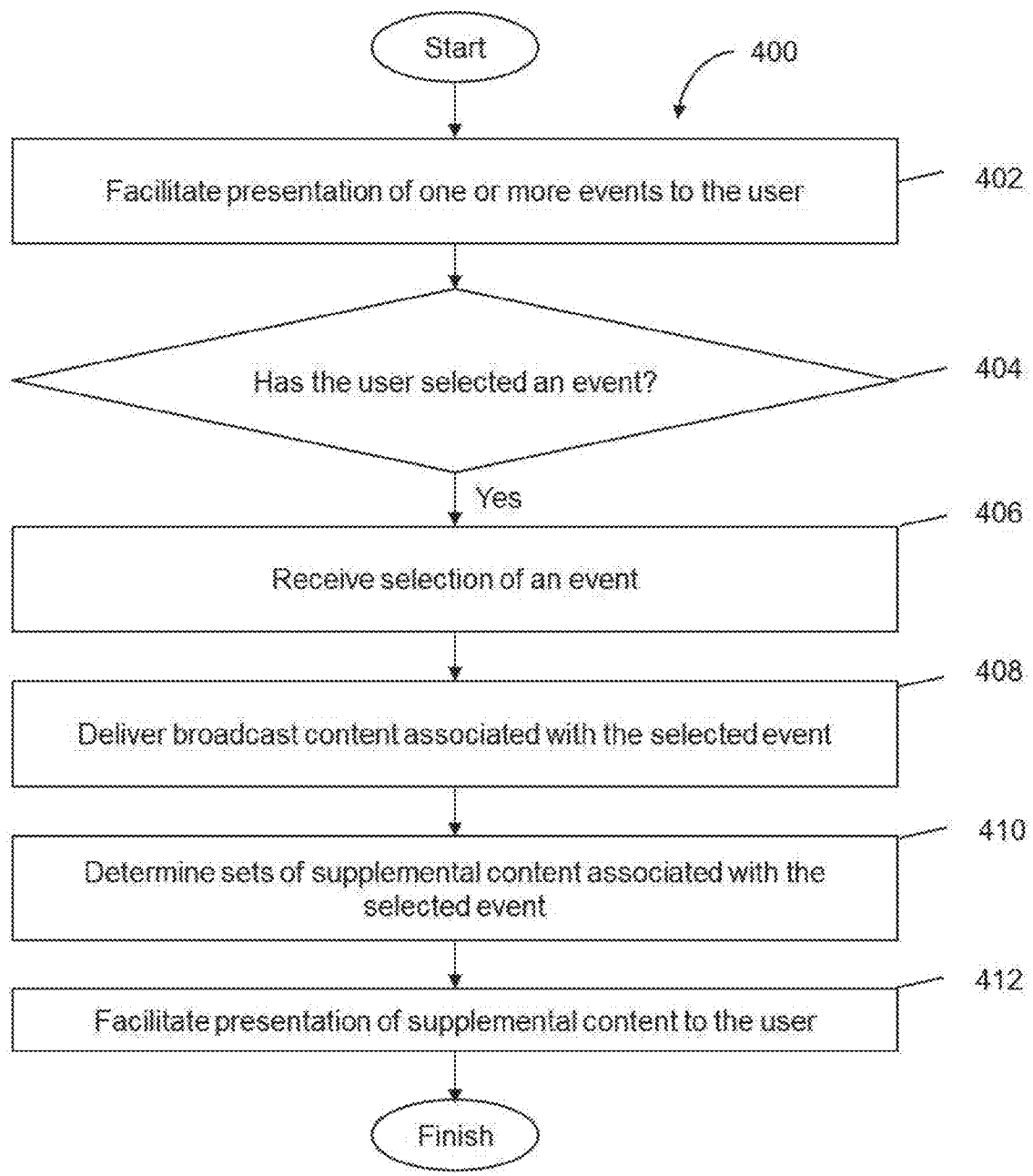
FIG. 4 illustrates a method for providing personalized experiences for users of a system for streaming of broadcast content over a network, in accordance with one or more implementations.

FIG. 4 illustrates a method 400 for providing personalized experiences for users of a system for streaming of broadcast content over a network, in accordance with one or more implementations. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, presentation of multiple events, to a user of a content experience system, may be facilitated. The presentation of the multiple events may be through a user interface presented using one or more client computing platforms associated with the user. Operation 402 may be performed by a presentation module that is the same as or similar to presentation module 124, in accordance with one or more implementations.

At an operation 404, a determination of whether the user has selected an event may be made. The user may select an event by interacting with the user interface presented to the user on the client computing platform associated with the user. The user may select a current event or the user may select a future event. Events may have one or more broadcast content streams provided by broadcast content providers over a network, such as the Internet. An event may be an event that the user intends to attend in person, such as a music concert, or a football game, or the event may be associated with one or more broadcast content streams to be provided by broadcast content providers, where the user receives the broadcast content streams associated with the event, facilitated by the content experience system. Operation 404 may be performed by a selection module that is the same as or similar to selection module 110, in accordance with one or more implementations.

At an operation 406, a selection and/or entry by a user of an event from amongst multiple events may be received. Such selection and/or entry may be made on a client computing platform associated with the user. Individual ones of events, of the multiple events, may be associated with sets of broadcast content streamed over the Internet by different content providers. Operation 406 may be performed by a selection module that is the same as or similar to selection module 110, in accordance with one or more implementations.

At an operation 408, in response to a reception of entry and/or selection by the user of a first event, delivery of broadcast content to the user may be effectuated. The client computing platform may be prepared for delivery of a stream of broadcast content including a first set of broadcast content. The first set of broadcast content may correspond to the first event. Operation 408 may be performed by a broadcast content delivery module that is the same as or similar to broadcast content delivery module 112, in accordance with one or more implementations.

At an operation 410, sets of supplemental content associated with selected events may be determined. At the operation 410, responsive to reception of selection and/or entry of the first event by the first user, a first set of supplemental content associated with the first set of broadcast content may be determined. Operation 410 may be performed by a supplemental content module that is the same as or similar to supplemental content module 114, in accordance with one or more implementations.

At an operation 410, sets of external supplemental content associated with one or more of the selected events may be identified. External supplemental content may be associated with an external Internet location, such as a website or on-line application. Such operations may be performed by a supplemental content module, the same as, or similar to, supplemental content module 114, in accordance with one or more implementations. Sets of merchandizing supplemental content associated with one or more of the selected events may be identified. Merchandizing supplemental content may facilitate the purchase of one or more items associated with the one or more selected events. Such operations may be performed by a merchandizing module, the same as, or similar to, merchandizing module 122, in accordance with one or more implementations.

At an operation 412, presentation to the user on the client computing platform of a user interface may be facilitated. The user interface may reflect the selection and/or entry of events by the user by presenting associated sets of supplemental content. For example, in response to reception and/or selection of the first event the user interface may present to the user the first set of supplemental content. Operation 412 may be performed by a presentation module that is the same as or similar to presentation module 124, in accordance with one or more implementations.

At an operation 412, presentation of an identified stream of a set of external supplemental content, associated with the selected event, to a user through the user interface on the client computing platform may be effectuated. Such presentation may be made in response to reception of the entry and/or selection of a first event, at an operation 406. Additionally, presentation of the external Internet location to the user may be effectuated, upon an interaction by the user with the identified stream of the set of external supplemental content.

At an operation 412 presentation of an identified stream of a set of merchandizing supplemental content, associated with the selected event, to a user through the user interface on the client computing platform may be effectuated. Such presentation may be made in response to reception of the entry and/or selection of a first event, at an operation 406. Additionally, purchase of merchandize may be facilitated upon an interaction by the user with the identified stream of the set of merchandizing supplemental content.

Figure 5:
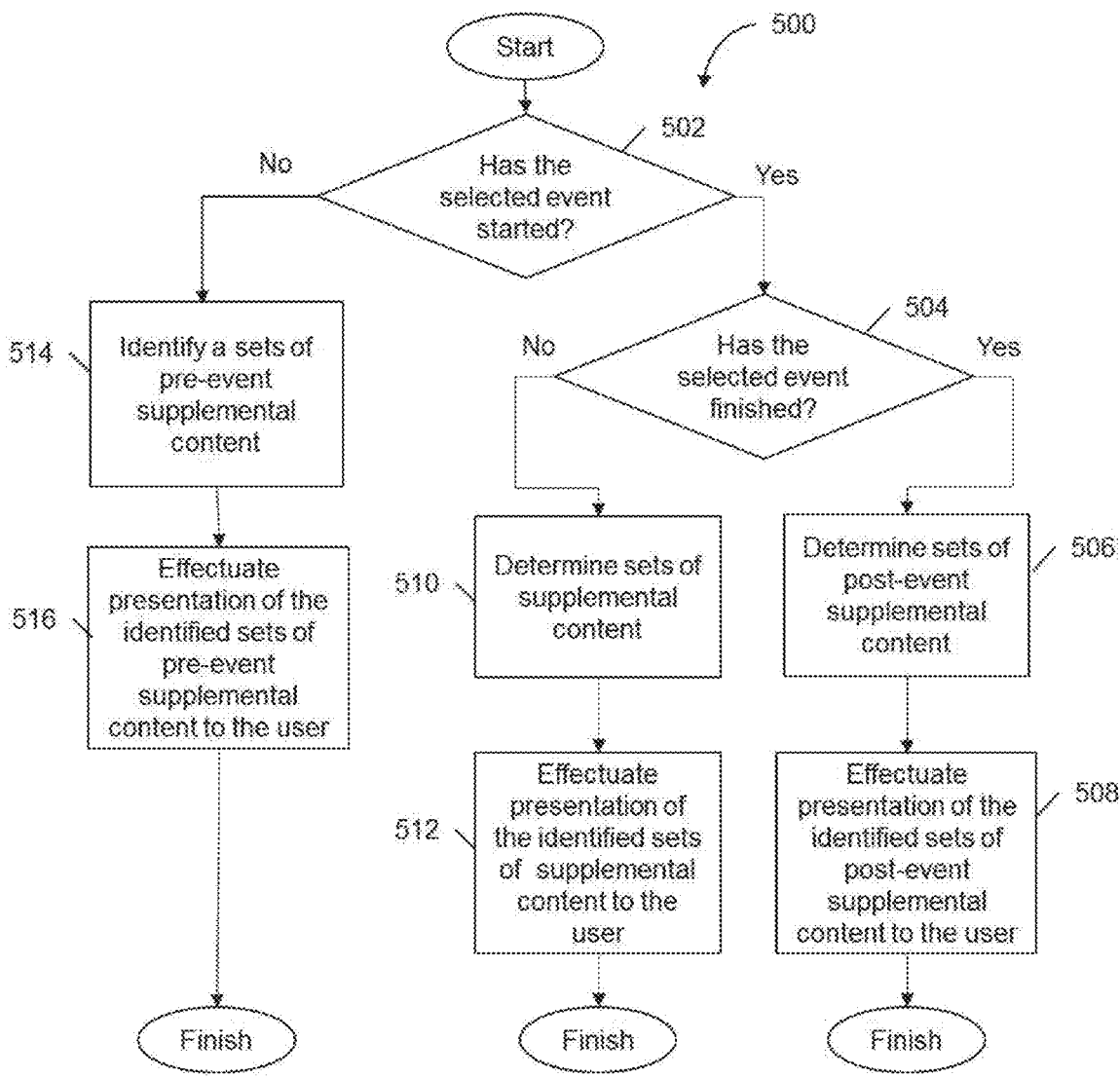
FIG. 5 illustrates a method for providing personalized experiences for users of a system for streaming of broadcast content over a network, in accordance with one or more implementations.

FIG. 5 illustrates a method 500 for providing personalized experiences for users of a system for streaming of broadcast content over a network, in accordance with one or more implementations. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, a determination of whether an event, selected by the user, for example at an operation 404, has commenced. An indication that the event has started may be provided by reaching a specified time when the event is scheduled to start. An indication that the event has started may be provided by a structured feed, or metadata, accompanying one or more streams of sets of broadcast content, provided by the broadcast content providers. Operation 502 may be performed by a broadcast content delivery module that is the same as or similar to broadcast content delivery module 112, in accordance with one or more implementations.

At an operation 504, responsive to a determination, at operation 502, that the event, selected by the user, has started, a determination may be made of whether the selected event has finished. An indication that the event has finished may be provided by reaching a specified time when the event was scheduled to finish. An indication that the event has finished may be provided by a structured feed, or metadata, accompanying one or more streams of sets of broadcast content, provided by the broadcast content providers. Operation 504 may be performed by a broadcast content delivery module that is the same as or similar to broadcast content delivery module 112, in accordance with one or more implementations.

At an operation 506, in response to a determination, at operation 504, that the selected event has finished, a stream of a set of post-event supplemental audio, visual and/or multimedia content associated with the first event that occurs after the first event may be identified. Operation 506 may be performed by a post-event module that is the same as or similar to post-event module 118, in accordance with one or more implementations.

At an operation 508, presentation of the identified stream of the set of post-event supplemental audio, visual and/or multimedia content to the user through the user interface on the client computing platform after to the first event may be effectuated. Such that, in response to an indication of the identification of the stream of the set of post-event supplemental audio, visual and/or multimedia content associated with the first event, at an operation 506, the post-event supplemental content may be presented to the first user using the user interface presented by the client computing platform associated with the user. Operation 508 may be performed by a presentation module that is the same as or similar to presentation module 124, in accordance with one or more implementations.

At an operation 510, in response to a determination, at operation 504, that the selected event has not finished, a stream of a set of supplemental audio, visual and/or multimedia content associated with the first event that occurs during the first event may be identified. Operation 510 may be performed by a supplemental content module that is the same as or similar to supplemental content module 114, in accordance with one or more implementations.

At an operation 512, presentation of the identified stream of the set of supplemental audio, visual and/or multimedia content to the user through the user interface on the client computing platform during the first event may be effectuated. Such that, in response to an indication of the identification of the stream of the set of supplemental audio, visual and/or multimedia content associated with the first event, at an operation 510, the supplemental content may be presented to the first user using the user interface presented by the client computing platform associated with the user. Operation 512 may be performed by a presentation module that is the same as or similar to presentation module 124, in accordance with one or more implementations.

At an operation 514, in response to a determination at operation 502 that the selected event has not started, a stream of a set of pre-event supplemental audio, visual and/or multimedia content may be identified. The supplemental audio and/or video content e associated with the first event may occur prior to the first event. Operation 514 may be performed by a pre-event module that is the same as or similar to pre-event module 116, in accordance with one or more implementations.

At an operation 516, presentation of the identified stream of the set of pre-event supplemental audio, visual and/or multimedia content to the user through the user interface on the client computing platform prior to the first event may be effectuated. Such that, in response to an indication of the identification of the stream of the set of pre-event supplemental audio, visual and/or multimedia content associated with the first event occurring prior to the first event, at an operation 514, the pre-event supplemental content may be presented to the first user using the user interface presented by the client computing platform associated with the user. Operation 516 may be performed by a presentation module that is the same as or similar to presentation module 124, in accordance with one or more implementations.

Figure 6:
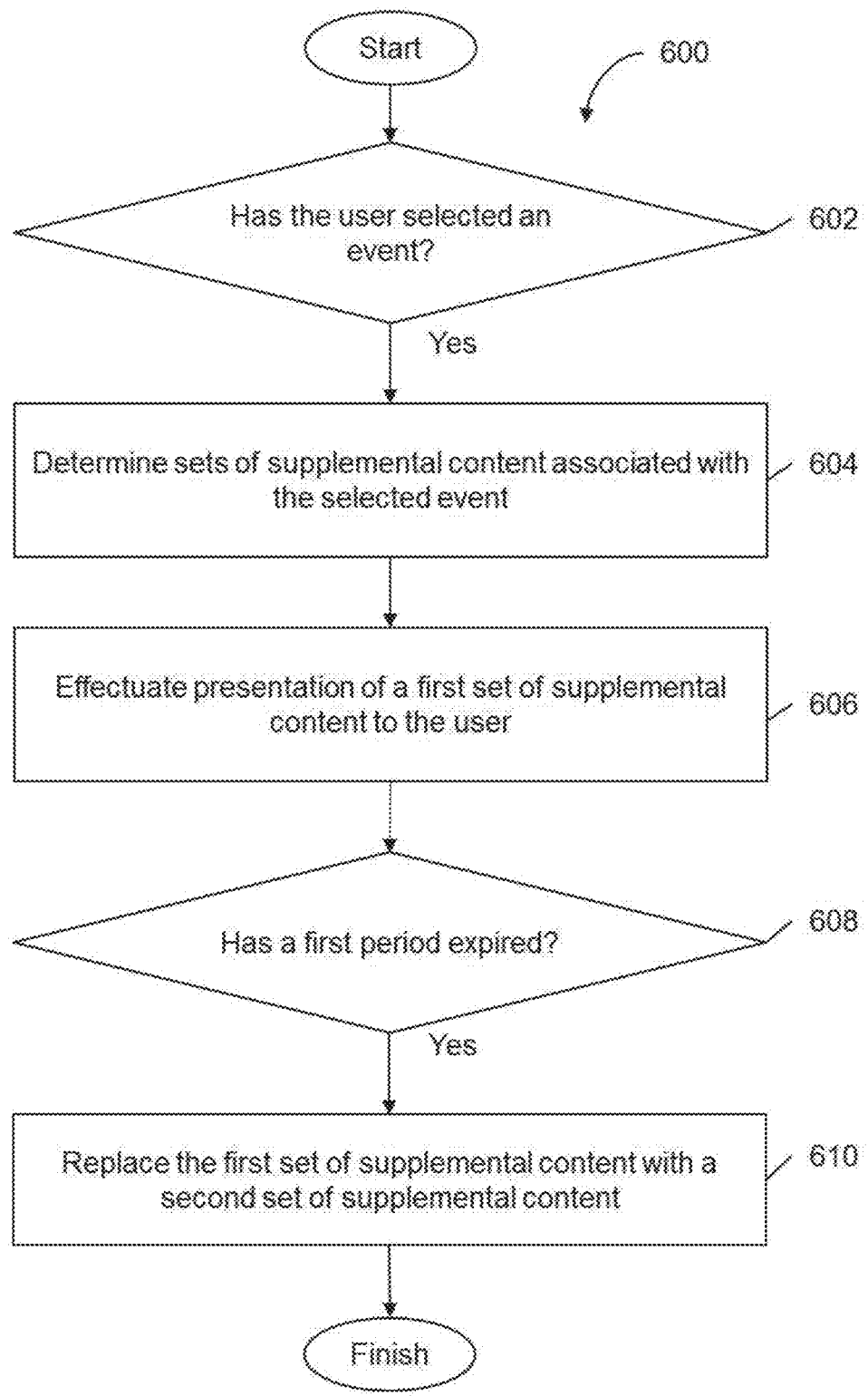
FIG. 6 illustrates a method for providing personalized experiences for users of a system for streaming of broadcast content over a network, in accordance with one or more implementations.

FIG. 6 illustrates a method 600 for providing personalized experiences for users of a system for streaming of broadcast content over a network, in accordance with one or more implementations. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, a determination of whether the user has selected an event may be made. The user may select an event by interacting with the interface presented to the user on the client computing platform associated with the user. The user may select a current event or the user may select a future event. Events may have one or more broadcast content streams provided by broadcast content providers over a network, such as the Internet. An event may be an event that the user intends to attend in person, such as a music concert, or a football game, or the event may be associated with one or more broadcast content streams to be provided by broadcast content providers, where the user receives the broadcast content streams associated with the event, facilitated by the content experience system. Operation 602 may be performed by a selection module that is the same as or similar to selection module 110, in accordance with one or more implementations.

At an operation 604, in response to a determination that the user has selected one or more events, sets of supplemental content associated with selected events may be determined. Operation 604 may be performed by a supplemental content module that is the same as or similar to supplemental content module 114, in accordance with one or more implementations.

At an operation 606, presentation to the user on the client computing platform of a first set of supplemental content associated with one or more of the selected events may be effectuated. Operation 606 may be performed by a presentation module that is the same as or similar to presentation module 124, in accordance with one or more implementations.

At an operation 608, a determination of whether a defined first period of time, associated with the first set of supplemental content, has expired, may be made. Operation 608 may be performed by a presentation module that is the same as or similar to presentation module 124, in accordance with one or more implementations.

At an operation 610, in response to a determination, at operation 608, that a defined first period of time, associated with the first set of supplemental content, has expired, presentation to the user on the client computing platform of a second set of supplemental content associated with one or more of the selected events may be effectuated. The second set of supplemental content may replace the first set of supplemental content. Operation 610 may be performed by a presentation module that is the same as or similar to presentation module 124, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer-implemented system comprising:
   one or more processors; and
   memory coupled to the one or more processors, the memory including a set of instructions configured to:
   receive input corresponding to a selection of a future event to be broadcasted over a radio network, wherein the future event is associated with broadcast content streamed over the Internet by a content provider, wherein the radio network and the Internet are separate networks, and wherein a future event is associated with pre-event broadcast data, current broadcast data, post-event broadcast data, a pre-determined start time, and a pre-determined stop time;
   in response to receiving the input corresponding to the selection of the future event to be broadcasted over the radio network:
      determine a set of broadcast content corresponding to the future event, wherein broadcast content includes pre-event broadcast data, current broadcast data, and post-event broadcast data, wherein the pre-event broadcast data is data that occurs before the pre-determined start time, wherein current broadcast data is data that occurs after the pre-determined start time and before the pre-determined stop time, and wherein post-event broadcast data is data that occurs after the pre-determined stop time; and determine a set of supplemental broadcast content corresponding to the future event, wherein supplemental broadcast content includes supplemental pre-event broadcast data associated with the pre-event broadcast data, supplemental current broadcast data associated with the current broadcast data, and supplemental post-event data associated with the post-event broadcast data, and wherein supplemental broadcast content is displayed separately from broadcast content; and facilitate presentation of the broadcast content and supplemental broadcast content through a broadcast content portion of a graphical interface, wherein pre-event broadcast data is concurrently displayed with supplemental pre-event broadcast data, current broadcast data is displayed concurrently with supplemental current broadcast data, and post-event broadcast data is concurrently displayed with supplemental post-event broadcast data.

2. The system of claim 1, wherein the future event includes an activity occurring external to one or more networks associated with a content experience system, the future event includes one of: a musical concert, a sporting event, a political event, a community rally, a holiday, an anniversary of a historical event, an award ceremony, or a festival.

3. The system of claim 1, wherein the future event corresponds to broadcast content taking place at a current or future date and at the pre-determined start time.

4. The system of claim 1, wherein the set of supplemental broadcast content is selected based on characteristics of the future event selected by a user and on one or more user characteristics.

5. The system of claim 4, wherein the one or more user characteristics includes user defined preferences, historical usage of the system, or historical purchases made through the system.

6. The system of claim 1, wherein the supplemental content comprises external supplemental content provided by one or more external Internet locations.

7. The system of claim 1, wherein the set of supplemental broadcast content further includes a set of merchandizing supplemental content corresponding to one or more purchasable items related to the future event, wherein the set of instructions are further configured to:
facilitate at least one purchase of the purchasable item by the user, in response to an interaction by a user with the set of merchandizing supplemental content.

8. The system of claim 1, wherein the set of instructions are further configured to:
determine a recommended event from amongst multiple events for a user, based on broadcast content streams the user has previously selected, broadcast content streams the user is currently receiving over the network, stored broadcast content stream preference information for the user, and other selectable broadcast content streams that are currently being streamed; and
facilitate presentation of the recommended event to the user.

9. A computer-implemented method comprising:
receiving, by one or more processors, input corresponding to a selection of a future event to be broadcasted over a radio network, wherein the future event is associated with broadcast content streamed over the Internet by a content provider, wherein the radio network and the Internet are separate networks, and wherein a future event is associated with pre-event broadcast data, current broadcast data, post-event broadcast data, a pre-determined start time, and a pre-determined stop time;
in response to receiving the input corresponding to the selection of the future event to be broadcasted over the radio network:
determining a set of broadcast content corresponding to the future event, wherein broadcast content includes pre-event broadcast data, current broadcast data, and post-event broadcast data, wherein the pre-event broadcast data is data that occurs before the pre-determined start time, wherein current broadcast data is data that occurs after the pre-determined start time and before the pre-determined stop time, and wherein post-event broadcast data is data that occurs after the pre-determined stop time; and
determining a set of supplemental broadcast content corresponding to the future event, wherein supplemental broadcast content includes supplemental pre-event broadcast data associated with the pre-event broadcast data, supplemental current broadcast data associated with the current broadcast data, and supplemental post-event data associated with the post-event broadcast data, and wherein supplemental broadcast content is displayed separately from broadcast content; and
facilitating presentation of the broadcast content and supplemental broadcast content through a broadcast content portion of a graphical interface, wherein pre-event broadcast data is concurrently displayed with supplemental pre-event broadcast data, current broadcast data is displayed concurrently with supplemental current broadcast data, and post-event broadcast data is concurrently displayed with supplemental post-event broadcast data.

10. The method of claim 9, wherein the future event includes an activity occurring external to one or more networks associated with a content experience system, the future event includes one of: a musical concert, a sporting event, a political event, a community rally, a holiday, an anniversary of a historical event, an award ceremony, or a festival.

11. The method of claim 9, wherein the future event corresponds to broadcast content taking place at a current or future date and at the pre-determined start time.

12. The method of claim 9, wherein the set of supplemental broadcast content is selected based on characteristics of the future event selected by a user and on one or more user characteristics.

13. The method of claim 12, wherein the one or more user characteristics includes user defined preferences, historical usage of the system, or historical purchases made through the system.

14. The method of claim 9, wherein the supplemental content comprises external supplemental content provided by one or more external Internet locations.

15. The method of claim 9, wherein the set of supplemental broadcast content further includes a set of merchandizing supplemental content corresponding to one or more purchasable items related to the future event, wherein the method further comprises:
facilitating at least one purchase of the purchasable item by the user, in response to an interaction by a user with the set of merchandizing supplemental content.

16. The method of claim 9, further comprising:
determine a recommended event from amongst multiple events for a user, based on broadcast content streams the user has previously selected, broadcast content streams the user is currently receiving over the network, stored broadcast content stream preference information for the user, and other selectable broadcast content streams that are currently being streamed; and facilitate presentation of the recommended event to the user.

17. A computer product comprising a non-transitory computer readable medium storing a plurality of instructions, the instructions comprising:

receiving input corresponding to a selection of a future event to be broadcasted over a radio network, wherein the future event is associated with broadcast content streamed over the Internet by a content provider wherein the radio network and the Internet are separate networks, and wherein a future event is associated with pre-event broadcast data, current broadcast data, post-event broadcast data, a pre-determined start time, and a pre-determined stop time;

in response to receiving the input corresponding to the selection of the future event to be broadcasted over the radio network:

determining a set of broadcast content corresponding to the future event, wherein broadcast content includes pre-event broadcast data, current broadcast data, and post-event broadcast data, wherein the pre-event broadcast data is data that occurs before the pre-determined start time, wherein current broadcast data is data that occurs after the pre-determined start time and before the pre-determined stop time, and wherein post-event broadcast data is data that occurs after the pre-determined stop time; and determining a set of supplemental broadcast content corresponding to the future event, wherein supplemental broadcast content includes supplemental pre-event broadcast data associated with the pre-event broadcast data, supplemental current broadcast data associated with the current broadcast data, and supplemental post-event data associated with the post-event broadcast data, and wherein supplemental broadcast content is displayed separately from broadcast content; and facilitating presentation of the broadcast content and supplemental broadcast content through a broadcast content portion of a graphical interface, wherein pre-event broadcast data is concurrently displayed with supplemental pre-event broadcast data, current broadcast data is displayed concurrently with supplemental current broadcast data, and post-event broadcast data is concurrently displayed with supplemental post-event broadcast data.

18. The computer product of claim 17, wherein the future event includes an activity occurring external to one or more networks associated with a content experience system, the future event includes one of: a musical concert, a sporting event, a political event, a community rally, a holiday, an anniversary of a historical event, an award ceremony, or a festival.

19. The computer product of claim 17, wherein the future event corresponds to broadcast content taking place at a current or future date and at the pre-determined start time.

20. The computer product of claim 17, wherein the set of supplemental broadcast content is selected based on characteristics of the future event selected by a user and on one or more user characteristics.

* * * * *